March 2, 1926.
M. M. GARLAND
VENTILATOR FOR BUSSES AND OTHER VEHICLES
Filed May 12, 1925   2 Sheets-Sheet 1
1,574,880
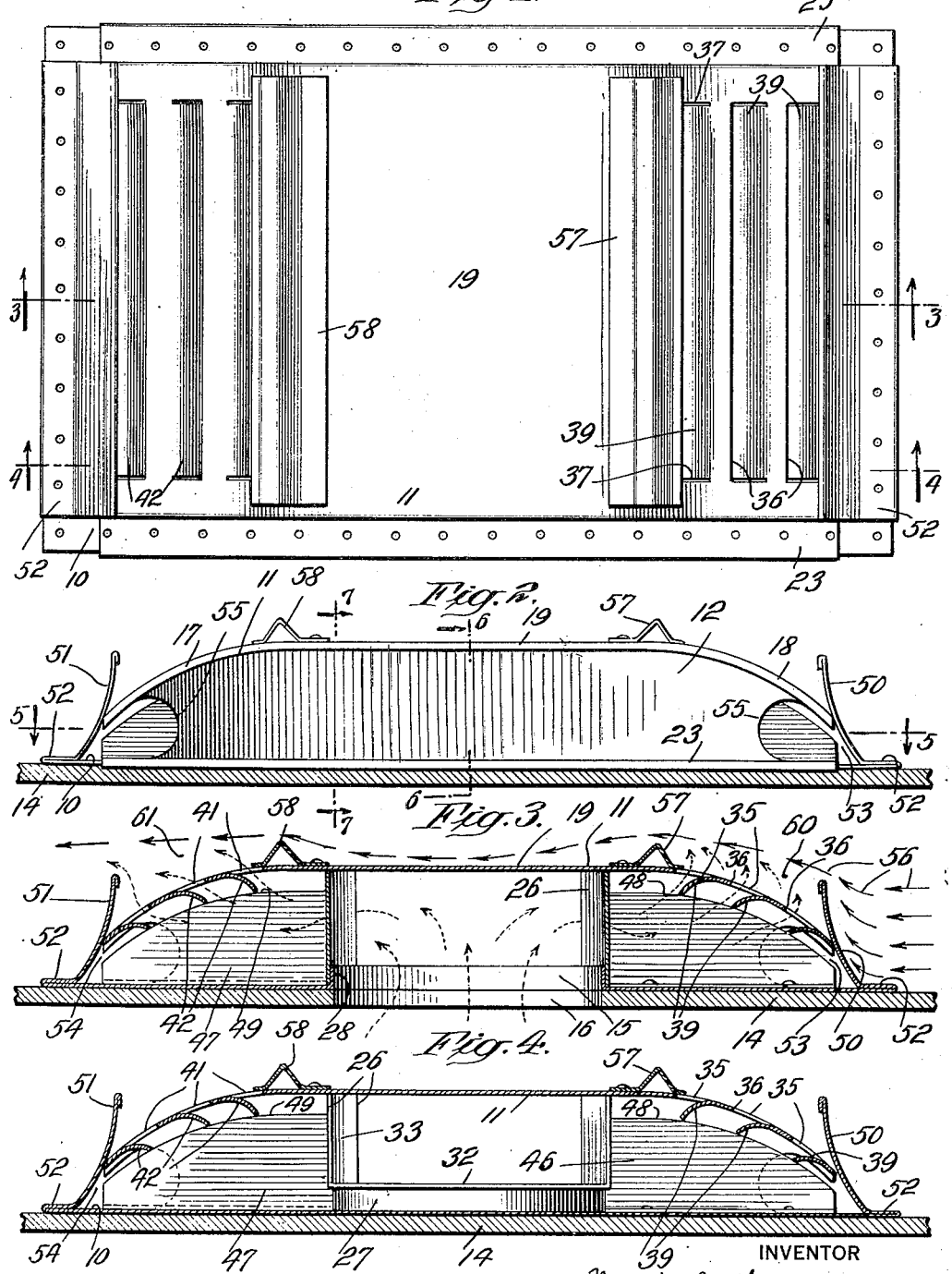
INVENTOR
Mamie M. Garland
BY
ATTORNEY March 2, 1926.  
M. M. GARLAND  
VENTILATOR FOR BUSSES AND OTHER VEHICLES  
Filed May 12, 1925 2 Sheets-Sheet 2
1,574,880
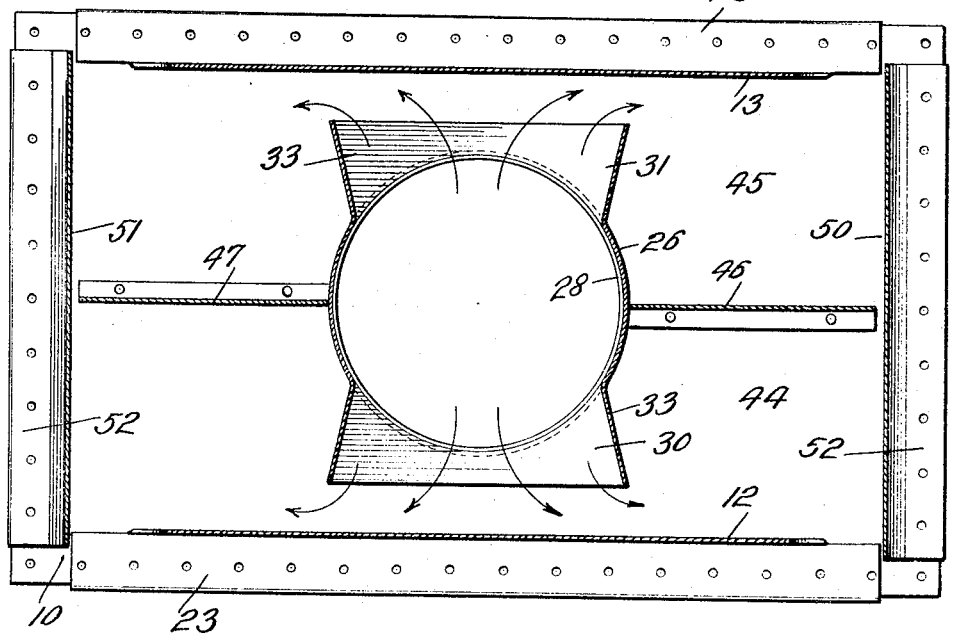
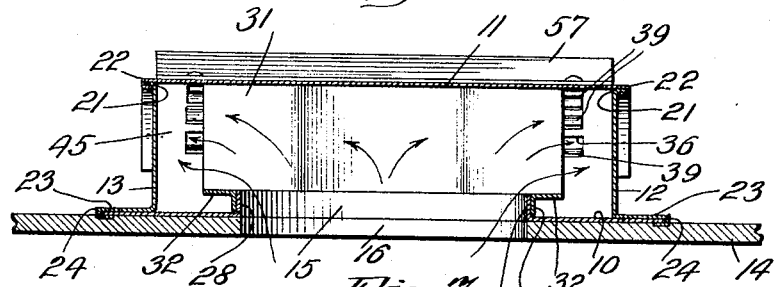
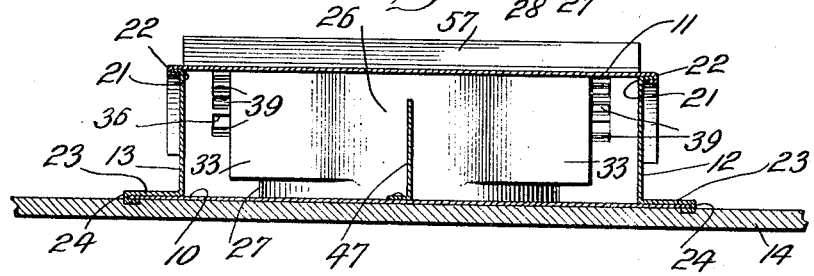
Mamie M. Garland INVENTOR
BY Chas. E. Gill
ATTORNEY Patented Mar. 2, 1926.

1,574,880

UNITED STATES PATENT OFFICE.

MAMIE M. GARLAND, OF CHICAGO, ILLINOIS, ASSIGNOR TO GARLAND VENTILATOR COMPANY, OF CHICAGO, ILLINOIS, A CORPORATION OF ILLINOIS.

VENTILATOR FOR BUSSES AND OTHER VEHICLES.

Application filed May 12, 1925. Serial No. 29,687.

*To all whom it may concern:*

Be it known that I, MAMIE M. GARLAND, a citizen of the United States, residing at Chicago, in the county of Cook and State of Illinois, have invented certain new and useful Improvements in Ventilators for Busses and Other Vehicles, of which the following is a specification.

The invention relates to an improvement in ventilators of the type adapted to be secured to the roof of a cab, bus, or like vehicle to exhaust the impure air from the interior of the vehicle.

One object of the invention is to produce a ventilator of this type whereby the impure air in the vehicle is more effectively withdrawn therefrom than is possible with ventilators of this type as heretofore constructed. A further object of the invention is to so construct and arrange the parts of the ventilator as to improve its appearance without diminishing its operating efficiency. Another object of the invention is to simplify the construction of the ventilator so as to increase its durability and reduce the cost of production. To these ends the invention consists in the improved ventilator hereinafter described and particularly pointed out in the claims.

In the accompanying drawings illustrating the preferred form of the invention Fig. 1 is a top plan of the improved ventilator; Fig. 2 is a side elevation of the ventilator structure shown in Fig. 1; Fig. 3 is a longitudinal section taken along the line 3—3 of Fig. 1, the arrows indicating the action of the air current; Fig. 4 is a longitudinal section taken along the line 4—4 of Fig. 1; Fig. 5 is a longitudinal section through the ventilator taken on the line 5—5 of Fig. 2; and Figs. 6 and 7 are transverse sections taken along the lines 6—6 and 7—7, respectively, of Fig. 2.

The improved ventilator as illustrated in the drawings is a low box-like structure of rectangular outline and is of greater length than width, as shown in Fig. 1. The ventilator is preferably made from sheet metal and comprises a base or bottom plate 10, a roof or top plate 11 and two walls or side plates 12 and 13. The base 10 is a flat, rectangular plate adapted to rest on the top or roof 14 of the cab, bus or other vehicle to which the ventilator is applied. In substantially the center of the base or bottom plate 10 is cut a round hole 15 which registers with the round hole 16 cut in the top of the cab or bus and which communicates with the interior thereof. Longitudinally, the roof or top plate 11 is in the shape of a low, flat arch having curved depressed end portions 17 and 18 and a flat middle portion 19; transversely the roof or top plate 11 is straight, as shown in Figs. 6 and 7. This low, flat arch-like contour of the top portion of the ventilator structure gives it a pleasing appearance when it is mounted on top of the cab or bus or other vehicle.

The two walls or side plates 12 and 13 have straight bottom edges resting on the two side or longitudinal margins of the bottom plate 10 and have their upper edges in conformity with the longitudinal contour of a top plate 11. The top edges of the side walls 12 and 13 are each provided with a laterally extending flange 21 (see Figs. 5 and 6) which is tightly embraced by the downwardly and inwardly turned side edges 22 of the top plate 11. The bottom edges of the side walls 12 and 13 extend outwardly laterally as flanges 23 the outer edges of which are turned downwardly and inwardly, as shown at 24, to embrace tightly the lateral edges of the bottom plate 10. The oblong hollow boxlike structure thus formed of sheet metal is strong and durable and lends itself readily to cheapness of manufacture and presents a pleasing appearance on the vehicle.

Arranged over the opening 16 in the roof 14 of the cab or bus is an eductor flue or exit nozzle 26 which is a cylindrical shell extending from the bottom plate 10 up to the underside of the flat middle portion 19 of the top plate 11. The lower end 27 of the cylindrical eductor flue fits over and tightly embraces the cylindrical walls 28 of the hole 15 in the bottom plate 10. The walls 28 may be formed by raising an upwardly projecting flange around the perimeter of the hole 15, which will be cut to the proper size for this purpose. The upper end of the eductor flue 26 is closed by the flat portion 19 of the top plate 11.

The upper part of the eductor flue is provided with the lateral, cowl-like openings 30 and 31. These lateral openings 30 and 31 are rectangular in cross section and are formed by the bottom plates 32 and side plates 33 extending from each side of the cylindrical eductor flue and terminating a relatively short distance from the side walls 12 and 13 of the ventilator structure. The top wall of the lateral openings 30 and 31 is formed by the flat portion 19 of the top plate 11. It will be observed by reference to Fig. 5 that the openings 30 and 31 flare outwardly from the cylindrical body portion of the eductor flue 26 so as thereby to afford the air drawn from the interior of the vehicle a more ready passage.

The curved end or depressed portion 18 of the top plate 11 is provided with the transverse elongated openings 35 formed by slitting the part 18 of the top plate 11 transversely at the points 36 and longitudinally at the points 37 and bending down the cut portions of metal 39, as shown in Figs. 3 and 4. The elongated transverse openings 41 in the depressed portion 17 of the top plate 11 are formed in a similar manner by cutting and bending downwardly the pieces of metal 42. These openings 35 and 41 communicate with the interior of the vehicle through the lateral openings 30 and 31 of the eductor flue and the longitudinal spaces 44 and 45 (Fig. 5) into which the centrally and vertically arranged partition walls 46 and 47 secured to the bottom plate 10 divide the interior of the box-like ventilator structure. It will be observed by reference to Figs. 3 and 4 that the upper edges 48 and 49, respectively, of the partition walls 46 and 47 do not extend to the top plate 11 and that the bottom edges of the downwardly bent portions 39 and 42 of the ends of the top plate 11 rest on the top edges 48 and 49 of the partition walls.

The eduction action by which the foul air is drawn out of the interior of the vehicle is effected by causing the air through which the vehicle is traveling to pass over the openings 35 and 41 at the requisite distance therefrom to create a properly proportioned vacuum space. The means for effecting this action consists of the end plates 50 and 51 which extend across the open ends 53 and 54 respectively of the ventilator structure. The end plates 50 and 51 are preferably formed by elongating and bending or folding the ends of the plate 10 upon itself, as at 52, to constitute a base and extending the plates 50 and 51 upwardly therefrom. The openings formed by the cutaway portions 55 of the ends of the side walls 12 and 13 to the rear of the plates 50 and 51 afford egress for rain or snow which falls on top of the bottom plate 10 through the openings 35 and 41.

The plates 50 and 51 arranged transversely across the ends of the ventilator act as baffles to deflect the air over the top of the ventilator, as indicated by the arrows 56 in Fig. 3, it being assumed in this figure that the vehicle is traveling from left to right. In order that the end plates 50 and 51 may more efficiently perform their function as baffles in deflecting the air properly over the openings 35 and 41 to create a suction action through these openings the plates 50 and 51 extend upwardly substantially as far as the top of the ventilator structure.

To provide a properly proportioned suction space above the openings 35 and 41 auxiliary baffles 57 and 58 are arranged transversely across the top plate 11 of the ventilator. These baffles 57 and 58 are caused to function efficiently in both directions of travel of the ventilator without offering undue resistance to the air by making them V-shaped in cross-section. The auxiliary baffles 57 and 58 may conveniently be formed from a single piece of sheet metal secured at its flanged edge to the flat portion 19 of the top plate 11. The auxiliary baffle 57 is arranged at the rear of the topmost of the openings 35 and the auxiliary baffle 58 is arranged at the rear of the topmost of the openings 41.

The apexes of these V-shaped auxiliary deflectors 57 and 58 are substantially the same height above the topmost of the openings 35 and 41 as the top edges of the baffle plates 50 and 51 are above the lowermost of the openings 35 and 41. In this manner vacuum spaces 60 and 61 (Fig. 3) are provided which are so proportioned that the requisite amount of air is drawn from the interior of the vehicle while it is in motion.

After passing the auxiliary baffle 57 the current of air strikes the front of the auxiliary baffle 58 and is deflected thereby over the openings 41. As indicated by the dotted arrows in Fig. 3 air is drawn through both series of openings 35 and 41, in whichever direction the vehicle is traveling. This is proven conclusively by testing the ventilator with smoke in actual practice, the dotted arrow lines indicating more or less accurately the currents of smoke educted from the interior of the vehicle. If the vehicle travels in the direction opposite to that indicated in Fig. 3. it will be understood of course that the positions of both the full line arrows and the dotted line arrows would be altered accordingly to indicate the reverse action of the ventilator.

The plates 46 and 47 not only serve to help support the curved or depressed ends 17 and 18 of the top plate 11 of the ventilator structure, but they also function to prevent eddies of air forming in front or to the rear of the cylindrical body portion of the eductor flue 26, depending upon the direction of travel of the vehicle, and also prevent the educted air from one opening 30 or 31 from passing around either in front or to the rear of the body part of the eductor flue and interfering with the eduction action taking place at the orifice of the other lateral opening. It will be understood that the ventilator satisfactorily educts the foul air from the vehicle when these partition plates 46 and 47 are not present, but it is believed that their presence serves to increase the efficiency of the apparatus and prevent foul air drawn out through one eductor opening from entering the other.

The improved ventilator has been described above as a double ended structure adapted to function in either direction of travel. It will be understood however that the ventilator may be used as a single ended structure to be mounted on a vehicle which travels only in one direction. In this case the parts constituting the ventilator structure may remain as described above or they may be altered by removing or closing up one end. In any event the principle of operation remains the same, namely, causing a draft of air to pass above the transverse openings in the top plate to create a vacuum space immediately above them to draw out the foul air from the interior of the vehicle.

So far as known the ventilator structure constructed and operated as described above is believed to function on a radically new principle and it is to be understood therefore that the structure shown is illustrative of principle only and may be embodied in other forms than that shown without departing from the spirit or scope of the following claims.

What I claim as my invention and desire to secure by Letters-Patent, is:

1. A ventilator comprising a low rectangular structure consisting of a bottom plate having a hole in its center adapted to register with a hole in the top of the vehicle to which the ventilator is applied, a top plate having a flat middle portion and depressed end portions, side walls extending from the bottom plate up to the top plate, an eductor flue mounted over the opening in the bottom plate and having lateral openings terminating short of the side walls, an upright transversely arranged baffle plate at each end of the structure, and two auxiliary baffle plates arranged transversely across the top of the structure at substantially the point where the depressed portions and the flat central part of the top meet, the depressed portions between each baffle plate and its corresponding auxiliary baffle plate being provided with openings.

2. A ventilator comprising, a low oblong structure consisting of a bottom plate having a hole adapted to register with a hole in the top of the vehicle to which the ventilator is applied, a top plate having depressed ends, side walls extending from the bottom plate up to the top plate, an eductor flue located over the hole in the bottom plate and having lateral cowl-like openings terminating short of the side walls, central partition walls extending from the front and rear sides of the eductor flue to the ends of the structure, each depressed end of the top plate having openings, and baffle plates arranged at each end of the ventilator structure to create a vacuum space above the openings in the ends of the top plate when the vehicle on which the ventilator is mounted travels in either direction.

3. A ventilator comprising, a box-like structure consisting of a bottom plate having a hole therein adapted to register with a hole in the top of the vehicle to which the ventilator is applied, a top plate having depressed end portions, side walls extending from the lateral margins of the bottom plate up to the lateral margins of the top plate, an eductor flue located over the hole in the bottom plate, the depressed end portions of the top plate being provided with openings, and two baffle plates arranged transversely across each end of the ventilator structure, one below and the other above the openings and projecting upwardly thereabove.

4. A ventilator comprising, an elongated box-like structure consisting of a bottom plate having a hole adapted to register with a hole in the top of the vehicle to which the ventilator is applied, a top plate having depressed end portions, side walls extending from the bottom plate up to the top plate, a partition wall dividing the box-like structure into two longitudinal compartments, an eductor flue interposed in the partition wall and arranged over the hole in the bottom plate, said eductor flue having lateral openings terminating short of the side walls, the depressed end portions of the top plate having transverse openings and two baffle plates arranged at each end of the ventilator structure, one in advance of the transverse openings and the other to the rear thereof, said baffles extending upwardly to provide a suction space above the openings, in either direction of travel of the vehicle to which the ventilator is applied.

5. A ventilator comprising, a box-like structure consisting of a bottom plate having a hole therein adapted to register with a hole in the top of the vehicle to which the ventilator is applied, a top plate having depressed end portions, side walls extending from the bottom plate up to the top plate, a partition plate extending from the forward and rear sides of the opening of the bottom plate to each end of the ventilator structure, said partition plate extending from the bottom plate up toward the top plate, the depressed end portions of the top plate having transverse slots therein formed by bending down portions of the material thereof to rest on top of the ends of the partition plate, two transverse baffle plates arranged at each end of the ventilator structure, one in advance of the transverse openings and the other to the rear of the transverse openings and extending upwardly above the openings, and an eductor flue arranged over the opening in the bottom plate and having openings giving into the compartments into which the partition plate divides the ventilator.

6. A ventilator comprising, an elongated box-like structure consisting of a bottom plate having a centralized hole therein adapted to register with a hole in the top of the vehicle to which the ventilator is applied, a top plate with two sets of transverse openings, and having a flat middle part and depressed end portions curving downwardly toward the bottom plate, side walls extending from the bottom plate up to the top plate, a transverse baffle plate arranged in advance of each set of transverse openings, an auxiliary transverse baffle plate arranged at the rear of the transverse openings, and an eductor flue located over the opening in the bottom plate and having openings through which the transverse openings in the top plate draw the air from the vehicle when the vehicle on which the ventilator is mounted travels in either direction.

7. A ventilator comprising, a low oblong structure consisting of a bottom plate having a centralized hole therein adapted to register with a hole in the top of the vehicle to which the ventilator is applied, a top plate having a flat middle part and depressed end portions curving toward the bottom plate, side walls extending from the bottom plate up to the top plate, an eductor flue located over the hole in the bottom plate and having lateral cowl-like openings terminating short of the side walls, the partition wall extending from the front and rear sides of the eductor flue to the ends of the ventilator structure, the depressed end portions of the top plate having transverse openings therein formed by striking downwardly portions of the top plate material, the bottoms of the struck in portions of material resting on the top of the ends of the partition wall, and two baffle plates arranged transversely across each end of the ventilator structure, one in advance of the transverse openings and the other at the rear thereof and projecting thereabove to create a vacuum space above the openings as the vehicle proceeds in either direction.

8. A ventilator comprising, a box-like structure consisting of a bottom plate having a hole adapted to register with a hole in the top of the vehicle to which the ventilator is applied, a top plate having a depressed portion facing the direction of travel of the vehicle, side walls extending from the bottom plate up to the top plate, an eductor flue located over the opening in the bottom plate and having a lateral opening giving into the interior of the ventilator, the depressed end of the top plate being provided with openings, and baffle plates arranged in advance and to the rear of the openings in the depressed portion of the top plate.

9. A ventilator comprising a bottom plate having a hole therein adapted to register with a hole in the top of the vehicle to which the ventilator is applied, a top plate having a depressed end sloping toward the bottom plate, walls extending from the bottom plate up to the top plate to form a hollow box-like structure, an eductor flue located over the opening in the bottom plate and having a lateral opening giving into the interior of the ventilator, the depressed portion of the top plate being provided with openings, and a baffle plate arranged to direct a current of air over the openings in the depressed portion of the top plate to create a vacuum space thereabove to draw air from the interior of the vehicle.

10. A ventilator comprising, a bottom plate having a hole therein adapted to register with a hole in the top of the vehicle to which the ventilator is applied, a top plate having a series of openings therein, walls extending from the bottom plate up to the top plate to form a hollow box-like structure, an eductor flue located over the hole in the bottom plate, and a baffle plate to direct a current of air over the openings in the top plate to create a vacuum space thereabove to draw air from the interior of the vehicle.

11. A ventilator comprising a structure consisting of a plate having a hole substantially in its center adapted to register with a hole in the vehicle to which the ventilator is applied, a second plate spaced from the first said plate and having a flat middle portion and end portions depressed towards the first plate, walls extending from plate to plate, a transversely arranged baffle plate at each end of the structure, and two auxiliary baffle plates arranged transversely across the second plate at substantially the point where the depressed portions and the flat central part of the second plate meet, the depressed portions between each baffle plate and its corresponding auxiliary baffle plate being provided with openings.

12. A ventilator, comprising a structure consisting of an inner plate having a hole adapted to register with a hole in the vehicle to which the ventilator is to be applied, an outer plate spaced from the inner plate and having an inwardly depressed end portion, walls extending from plate to plate, said inwardly depressed end portion having a series of transverse openings, and a transverse baffle plate at one end of the series of openings in the spaced outer wall.

13. A ventilator comprising a structure consisting of an inner plate having a hole adapted to register with a hole in the vehicle to which the ventilator is to be applied, an outer plate spaced from the inner plate and having an inwardly depressed end portion, walls extending from plate to plate, said inwardly depressed end portion having a series of transverse openings, a transverse baffle plate at one end of the series of openings in the spaced outer wall, and an auxiliary baffle at the other end of the series of openings.

14. A ventilator, comprising a structure consisting of a plate having a hole adapted to register with a hole in the vehicle to which the ventilator is to be applied, an outer plate spaced from the inner plate and having a flat portion and inwardly depressed portions, said portions each having a transverse series of openings and said flat portion being between them, walls extending from plate to plate, inwardly bent portions extending from the outer plate at one side of the said openings, and baffles in advance of and behind the respective series of openings and extending outwardly from the structure.

In testimony whereof I hereunto affix my signature.

MAMIE M. GARLAND.